(12) United States Patent
Lee

(10) Patent No.: US 10,558,673 B2
(45) Date of Patent: Feb. 11, 2020

(54) TECHNIQUES FOR PROSPECTIVE CONTACT RANKING OF ADDRESS BOOK ENTRIES

(71) Applicant: Facebook, Inc., Menlo Park, CA (US)

(72) Inventor: Han Gyul Lee, Sunnyvale, CA (US)

(73) Assignee: FACEBOOK, INC., Menlo Park, CA (US)

(*) Notice: Subject to any disclaimer, the term of this patent is extended or adjusted under 35 U.S.C. 154(b) by 190 days.

(21) Appl. No.: 15/647,319

(22) Filed: Jul. 12, 2017

(65) Prior Publication Data
US 2019/0018848 A1    Jan. 17, 2019

(51) Int. Cl.
G06F 17/30    (2006.01)
G06F 15/16    (2006.01)
G06F 16/2457    (2019.01)
H04L 12/58    (2006.01)
G06F 16/901    (2019.01)
H04L 29/12    (2006.01)

(52) U.S. Cl.
CPC .... G06F 16/24578 (2019.01); G06F 16/9024 (2019.01); H04L 51/04 (2013.01); H04L 61/1564 (2013.01)

(58) Field of Classification Search
None
See application file for complete search history.

(56) References Cited

U.S. PATENT DOCUMENTS

| | | | |
|---|---|---|---|
| 9,262,446 B1* | 2/2016 | Katragadda | G06F 16/20 |
| 9,363,135 B1* | 6/2016 | Merom | H04L 29/08072 |
| 2009/0319288 A1* | 12/2009 | Slaney | G06Q 10/10 705/1.1 |
| 2013/0103758 A1* | 4/2013 | Alison | G06Q 30/02 709/204 |
| 2014/0324841 A1* | 10/2014 | Isaacs | G06Q 10/107 707/723 |
| 2016/0103922 A1* | 4/2016 | Ilic | H04L 51/32 707/751 |
| 2016/0164809 A1* | 6/2016 | Krug | H04L 51/043 715/752 |
| 2018/0011854 A1* | 1/2018 | Yi | G06F 16/951 |

\* cited by examiner

Primary Examiner — Natisha D Cox

(57) ABSTRACT

Techniques for prospective contact ranking of address book entries are described. In one embodiment, an apparatus may comprise a client front-end component operative to receive a prospective contact display prompt from a client application on a client device, the client application associated with a user account; receive an address book from the client device, the address book comprising a plurality of address book entries; and send the ordered prospective contact list to the client application on the client device; a prospective contact list component operative to determine a prospective contact list based on the address book, the prospective contact list comprising a plurality of prospective contacts; and a contact ranking component operative to determine a ranking weight for each of the plurality of prospective contacts; and generate an ordered prospective contact list by ordering the prospective contact list based on the ranking weights. Other embodiments are described and claimed.

20 Claims, 12 Drawing Sheets

500

> Receive a prospective contact display prompt from a client application on a client device, the client application associated with a user account.
> 502

> Receive an address book from the client device, the address book external to the client application, the address book comprising a plurality of address book entries.
> 504

> Determine a prospective contact list based on the address book, the prospective contact list comprising a plurality of prospective contacts.
> 506

> Determine a ranking weight for each of the plurality of prospective contacts.
> 508

> Generate an ordered prospective contact list by ordering the prospective contact list based on the ranking weight for each of the plurality of prospective contacts.
> 510

> Send the ordered prospective contact list to the client application on the client device.
> 512

*FIG. 5*

TECHNIQUES FOR PROSPECTIVE CONTACT RANKING OF ADDRESS BOOK ENTRIES

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for prospective contact ranking of address book entries. Some embodiments are particularly directed to techniques for prospective contact ranking of address book entries based on existing-contact address book membership for the prospective contacts. In one embodiment, for example, an apparatus may comprise a client front-end component operative to receive a prospective contact display prompt from a client application on a client device, the client application associated with a user account; receive an address book from the client device, the address book external to the client application, the address book comprising a plurality of address book entries; and send the ordered prospective contact list to the client application on the client device; a prospective contact list component operative to determine a prospective contact list based on the address book, the prospective contact list comprising a plurality of prospective contacts; and a contact ranking component operative to determine a ranking weight for each of the plurality of prospective contacts; and generate an ordered prospective contact list by ordering the prospective contact list based on the ranking weight for each of the plurality of prospective contacts. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 5 illustrates an embodiment of a logic flow for the system of FIG. 1.

DETAILED DESCRIPTION

Figure 1:
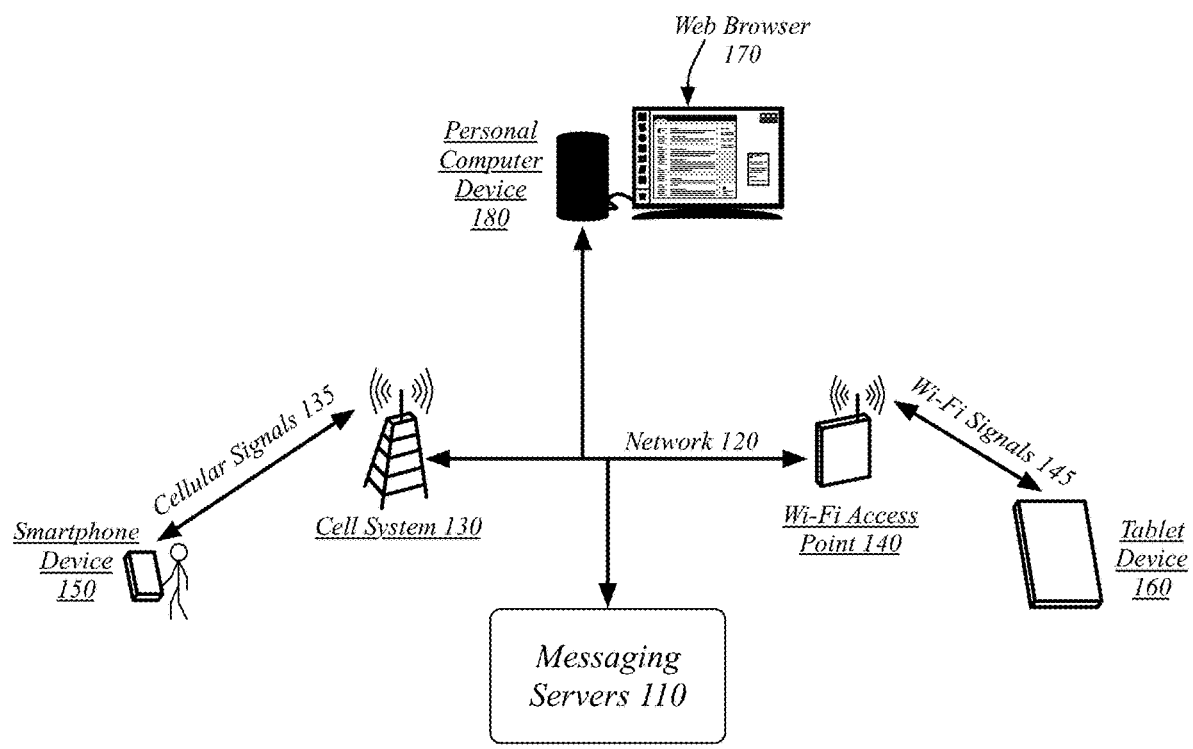
FIG. 1 illustrates an embodiment of an address book contact promotion system.

A messaging system may support a large number and a large variety of users. Users may have contacts on the messaging system, where contacts correspond to other users with which they have a relationship registered with the messaging system. In addition to a messaging system client application with associated contacts, a user may have an address book external to the messaging application. A user may communicate with contacts in the address book using other means, such as SMS messages in an SMS application, electronic mail messages, and voice phone calls. Users may wish to communicate with their address book contacts using the messaging system client application and the messaging system. Users may be provided with a ranked list of their address book contacts so that the contacts may be invited to use the messaging system. The ranking of contacts may be based on a contact graph including the user, messaging system contacts, and the address book contacts.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-$a$ may include components 122-1, 122-2, 122-3, 122-4 and 122-5. The embodiments are not limited in this context.

FIG. 1 illustrates a block diagram for an address book contact promotion system 100. In one embodiment, the address book contact promotion system 100 may comprise a computer-implemented system having software applications comprising one or more components. Although the address book contact promotion system 100 shown in FIG. 1 has a limited number of elements in a certain topology, it may be appreciated that the address book contact promotion system 100 may include more or less elements in alternate topologies as desired for a given implementation.

Messaging servers 110 may comprise one or more messaging servers operated by a messaging platform as part of a messaging system. A messaging server may comprise an Internet-accessible server, with the network 120 connecting the various devices of the messaging system comprising, at least in part, the Internet. A messaging system may use the messaging servers 110 to support messaging for various user client devices.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110. A smartphone device 150 may include telephone voice-call capabilities, short message service (SMS) capabilities, and other phone-related capabilities, without limitation.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging platform including the messaging servers 110. A dedicated messaging client may be a general client operative to work with a plurality of different messaging providers including the messaging provider administering the messaging platform including the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for the social networking service, with the computing device providing additional functionality of the social networking service. Similarly, the social networking application may provide both messaging functionality and additional social networking functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a mailbox, a deletion of a message from a mailbox, and a read receipt.

A messaging system may operate by defining a messaging inbox as comprising a plurality of messages, wherein each message is an individual transaction of communication between two or more participants. A mail server may operate by maintaining a message index for the messaging inbox. Mail servers may receive messages and store the messages in mail archives from which messages may be retrieved through reference to the message index. Mail clients may connect to the mail servers and retrieve messages that have been added to their mail archive since their last update. The mail clients may receive a mail index from the mail archive indicating what messages are stored in the mail archive. The mail clients may compare the mail archive to their current inbox in order to determine what messages they are missing, which they then request from the mail archive. The mail clients may make changes to their inbox, which results in mail inbox instructions being transmitted to the mail archives instructing the mail archives in modifications to make to the representation of their mail inbox on the mail archives.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members.

Any of the user devices 150, 160, and 180 may have an address book external to the messaging client. In some embodiments, the address book may be supplied by the provider of the operating system of the device; or the address book may be added by the user to be synchronized among the devices 150, 160, and 180. In other embodiments, an address book on one of the devices may stand alone and may differ from an address book stored on another of the devices. The address book may be stored as a file on one or more of the devices, and/or may be stored remotely and accessed via a user account, for example, one associated with an email service provider. The address book may include a set of contacts for the user, and may include various information to identify each contact and ways of communicating with a contact. For example, a contact in the address book may have an associated name, one or more telephone numbers, one or more mailing addresses, one or more electronic mail addresses, chat handle names, social network aliases, business name, a photo or other image, and so forth. The address book may contain contacts of friends, relatives, colleagues, client businesses, businesses that the user has contacted or plans to contact, and so forth. Some or many of the contacts may be associated with people or businesses with which the user rarely or no longer interacts.

The messaging system may use knowledge generated from interactions in between users. The messaging system may comprise a component of a social-networking system and may use knowledge generated from the broader interactions of the social-networking system. As such, to protect the privacy of the users of the messaging system and the larger social-networking system, messaging system may include an authorization server (or other suitable component(s)) that allows users to opt in to or opt out of having their actions logged by the messaging system or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging system and other elements of a social-networking system through blocking, data hashing, anonymization, or other suitable techniques as appropriate.

Figure 2:
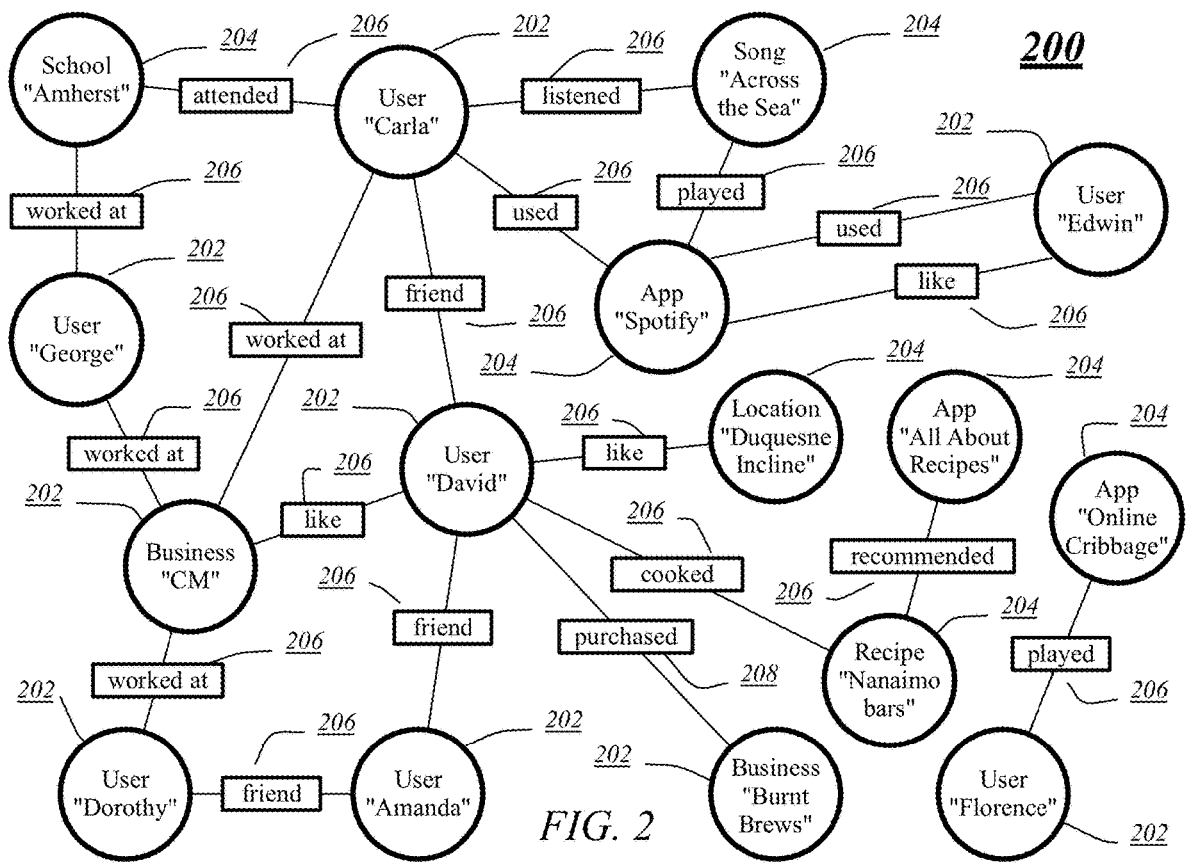
FIG. 2 illustrates an embodiment of a social graph.

FIG. 2 illustrates an example of a social graph 200. In particular embodiments, a social-networking system may store one or more social graphs 200 in one or more data stores as a social graph data structure.

In particular embodiments, social graph 200 may include multiple nodes, which may include multiple user nodes 202 and multiple concept nodes 204. Social graph 200 may include multiple edges 206 connecting the nodes. In particular embodiments, a social-networking system, client system, third-party system, or any other system or device may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of the social-networking system. As an example and not by way of limitation, a user may be an individual (human user), an entity (e.g., an enterprise, business, or third-party application), or a group (e.g., of individuals or entities) that interacts or communicates with or over the social-networking system. In particular embodiments, when a user registers for an account with the social-networking system, the social-networking system may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system. In particular embodiments, a user node 202 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages. A user node 202 may be associated with a unique user identifier for the user in the social-networking system.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. A business page may comprise a user-profile page for a commerce entity. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 206 connecting the first user's user node 202 to the second user's user node 202 in social graph 200 and store edge 206 as social-graph information in one or more data stores. In the example of FIG. 2, social graph 200 includes an edge 206 indicating a friend relation between user nodes 202 of user "Amanda" and user "Dorothy." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Across the Sea"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "Edwin" and concept node 204 for "SPOTIFY").

In particular embodiments, the social-networking system may create an edge 206 between a user node 202 and a concept node 204 in social graph 200. As an example and not by way of limitation, a user viewing a concept-profile page (such as, for example, by using a web browser or a special-purpose application hosted by the user's client system) may indicate that he or she likes the concept represented by the concept node 204 by clicking or selecting a "Like" icon, which may cause the user's client system to send to the social-networking system a message indicating the user's liking of the concept associated with the concept-profile page. In response to the message, the social-networking system may create an edge 206 between user node 202 associated with the user and concept node 204, as illustrated by "like" edge 206 between the user and concept node 204. In particular embodiments, the social-networking system may store an edge 206 in one or more data stores. In particular embodiments, an edge 206 may be automatically formed by the social-networking system in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

The social graph 200 may further comprise a plurality of product nodes. Product nodes may represent particular products that may be associated with a particular business. A business may provide a product catalog to a consumer-to-business service and the consumer-to-business service may therefore represent each of the products within the product in the social graph 200 with each product being in a distinct product node. A product node may comprise information relating to the product, such as pricing information, descriptive information, manufacturer information, availability information, and other relevant information. For example, each of the items on a menu for a restaurant may be represented within the social graph 200 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 200. The information for a product node may be manipulated by the social-networking system as a product object that encapsulates information regarding the referenced product.

Figure 3A:
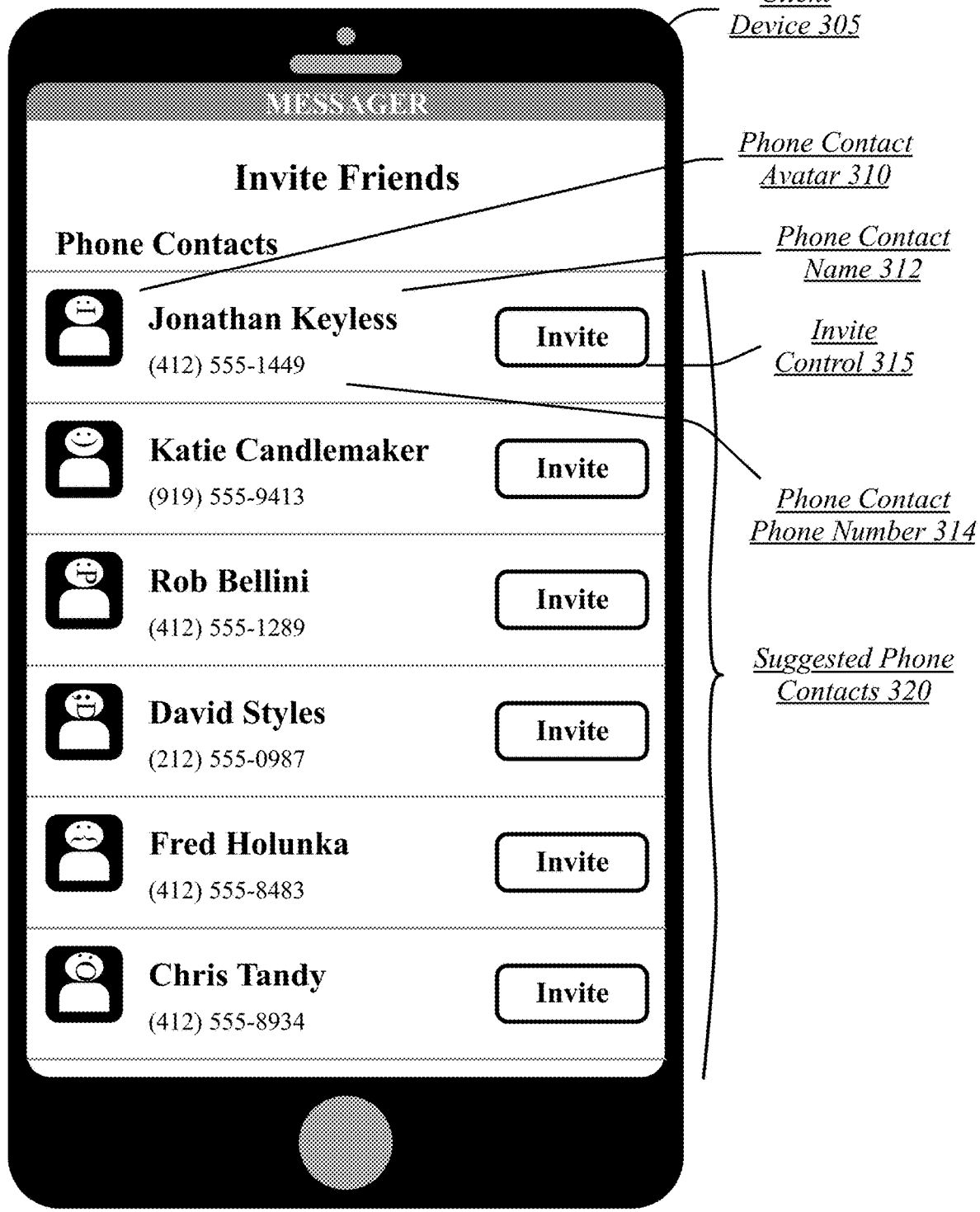
FIG. 3A illustrates an embodiment of a user interface for promoted phone contacts.

FIG. 3A illustrates an embodiment of a user interface 300 for promoted phone contacts.

A client device 305 may correspond to any device used to access a address book contact promotion system 100. While in the illustrated embodiment of FIG. 3A the client device 305 resembles a smartphone device, it will be appreciated that the techniques described herein may be used with any type of device.

A phone contact discovery display may correspond to a discovery interface for a messaging client. A discovery interface may empower a user to discover phone contacts and/or other contacts within a messaging client. A discovery interface may correspond to a discovery tab within the messaging client of a plurality of interface tabs. A discovery interface may be displayed in combination with other interfaces. For example, a search interface may default to a display of suggested contacts, with the suggested contacts presented as the default suggestions, that may be replaced or refined based on search information entered by the user.

A phone contact discovery display may comprise a plurality of suggested phone contacts 320. The suggested phone contacts 320 may comprise a plurality of entries, each comprise a suggested phone contact. The suggested phone contacts 320 may each be a phone contact suggested to a user. A phone contact may be selected for suggestion to a user based on a variety of factors. Phone contacts may be suggested for invitation to the use of the messaging application, messaging system, other communication system, for messaging using the messaging system, or for communication using a communication system, without limitation. Phone contacts may be selected and/or ranked based on user information, contextual information, and/or information related to expanding the user base of a communication system such as a messaging system.

A display of a suggested phone contact may comprise phone contact information. Phone contact information may include a phone contact name 312, the phone contact name 312 comprising a name determined for the phone contact. A phone contact name 312 may be determined based on a name specified for a phone contact in an address book for the client device 305.

Phone contact information may include a phone contact icon 340, the phone contact icon 340 comprising an avatar, logo, or other icon representing the phone contact. The phone contact icon 340 may be determined, without limitation, based on a contact photo associated with the phone contact in an address book for the client device 305. In some cases, only some of the suggested phone contacts 320 may have an associated photo, such as where the address book for the client device 305 lacks a photo for one or more of the address book entries.

Phone contact information may include a phone contact phone number 314. The phone contact phone number 314 may comprise a phone number for the phone contact retrieved from the address book entry for the phone contact. The phone contact information may include additional information retrieved from an address book for the client device 305 and/or generated based on other sources of information.

The user interface 300 for the suggested phone contacts 320 may comprise an invite control 315 associated with each of the plurality of phone contacts. An invite control 315 may empower the invitation of an associated phone contact to use a messaging client, messaging system, or other system or service. Selecting an invite control 315, such as by using a touch-screen control, may initiate a process of inviting a phone contact. In some embodiments, selecting a portion of a display for a phone contact may initiate the display of additional information for the phone contact.

Figure 3B:
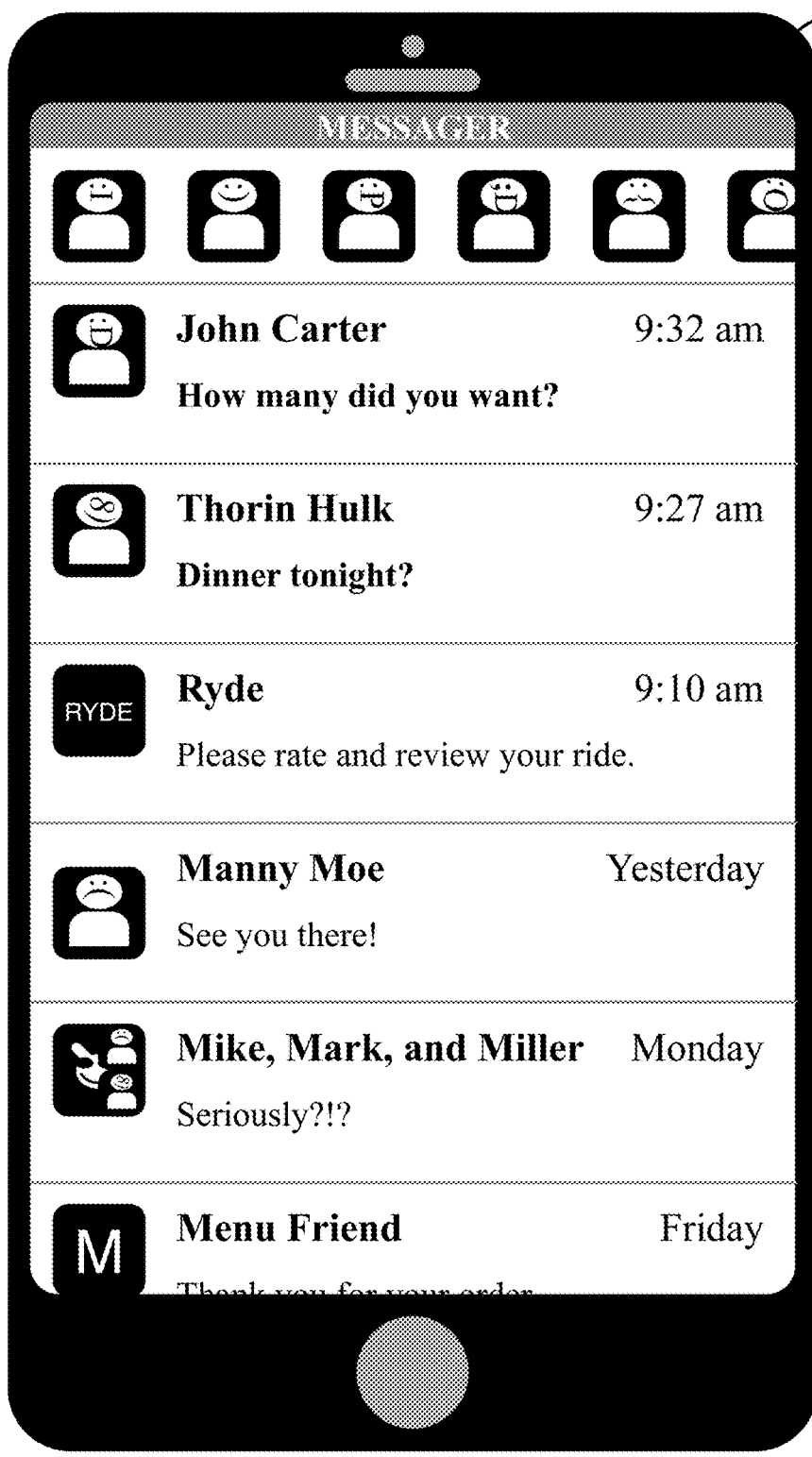
FIG. 3B illustrates an embodiment of a user interface for promoted phone contacts in a messaging-client inbox interface.

FIG. 3B illustrates an embodiment of a user interface 325 for promoted phone contacts in a messaging-client inbox interface.

The user interface 325 may generally correspond to a display of a user inbox for a messaging system. The user interface 325 may comprise a display of a plurality of threads in an inbox for a user account. A portion of displayed threads may be threads with unread messages 340. A portion of displayed threads may be threads without unread messages 345. The threads with unread messages 340 may be displayed with a higher prominence than the threads without unread messages 345, such as by placing them in a more prominent position. In the illustrated embodiment of FIG. 3B, the user interface 300 may be scrolled downwards to reveal more threads.

The threads with unread messages 340 may be displayed in a higher position than the threads without unread messages 345, with additional threads without unread messages 345 being viewable by scrolling downwards. In some cases, sufficient threads with unread messages 340 may exist that the threads without unread messages 345 are only visible by scrolling downwards, with the threads with unread messages 340 being sufficient in number to take up all the available screen space in an initial display of an inbox. The display of threads in an inbox may comprise, for each thread, a display of a name of a thread, a last-received or last-exchanged messages in the thread, a preview of the contents of the thread, and an avatar for one or more users in the thread. The name of the thread may correspond to the name(s) of one or more participants in the thread other than the name for the user account for the inbox.

The user interface 300 for the messaging inbox may include a promoted phone contacts display 330. The promoted phone contacts display 330 may comprise a plurality of display elements, wherein each display element corresponds to a phone contact. The promoted phone contacts display 330 may be displayed in a high-prominence area of an inbox, such as the top of a display of the inbox. The promoted phone contacts display 330 may be displayed in an initial view of the inbox. The initial view of the inbox may be the view reached when loading a messaging client. The initial view of the inbox may be the view reached when selecting an inbox view control in the messaging client.

The promoted phone contacts display 330 may include a display for one or more prospective users of a messaging system, with the selection of a display for a messaging bot initiating an invitation to the selected contact for invitation to a messaging system. For instance, in a messaging system, the selection of the display for the phone contact may instantiate a dialog for inviting the selected contact. A display for a phone contact may comprise an avatar for the phone contact (e.g., a photo), a display of a name for a phone contact, or any other information.

Figure 3C:
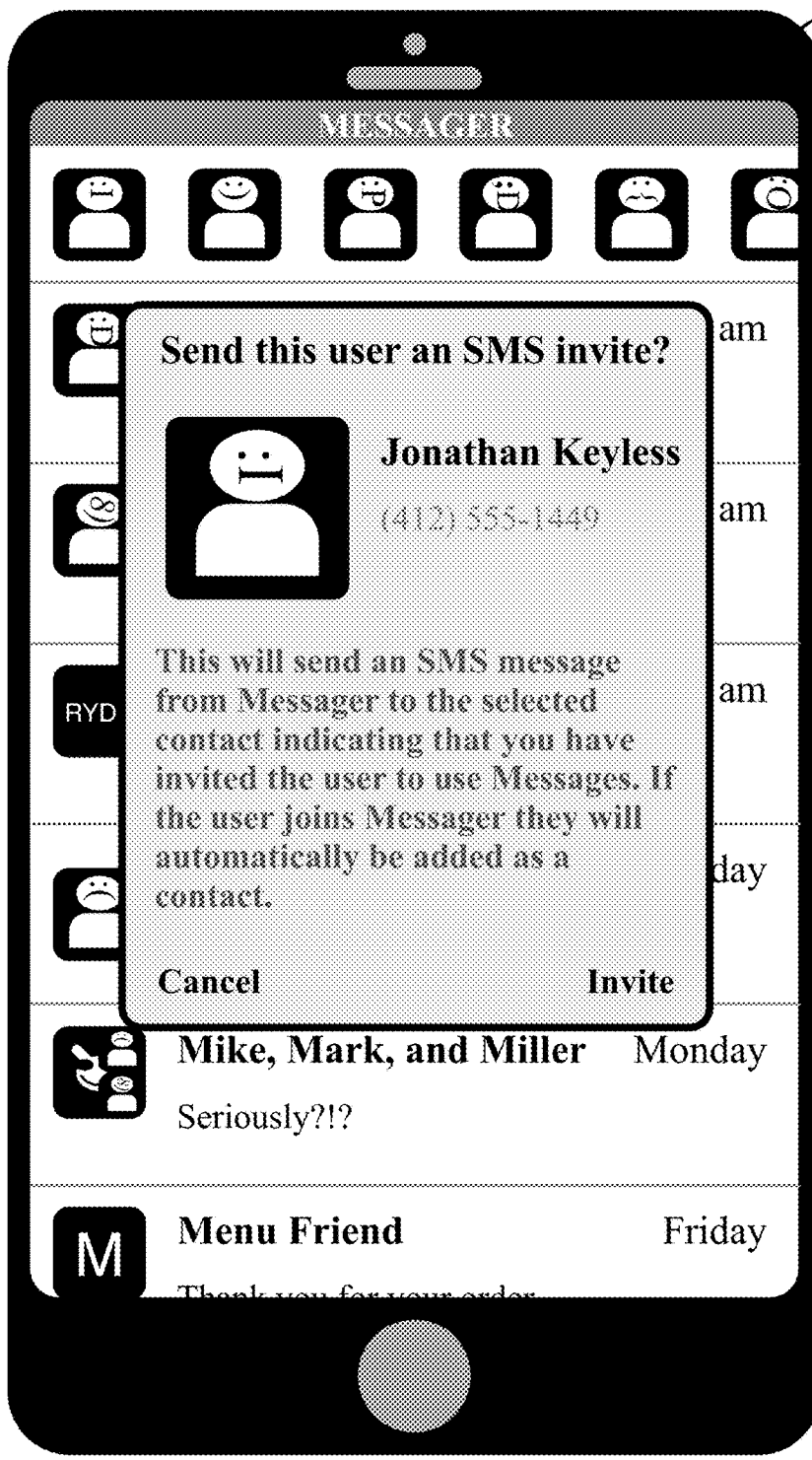
FIG. 3C illustrates an embodiment of a user interface with a phone contact add dialog.

FIG. 3C illustrates an embodiment of a user interface with a phone contact add dialog 360.

The selection of a particular prospective contact of the promoted phone contacts display 330 or suggested phone contacts 320 may initiate a process of inviting the selected phone contact to use the messaging system. In some embodiments, the contact may be immediately invited. In some embodiments, a phone contact add dialog 360 may be displayed, where the phone contact add dialog 360 empowers a user to select whether they want to have an invitation sent to the phone contact.

A phone contact add dialog 360 may include a cancel control empowering the user to refrain from inviting the phone contact and to extract themselves from the phone contact add dialog 360. A phone contact add dialog 360 may include an invite contact control empower the user to invite the contact. Inviting a phone contact may initiate actions within a messaging system. The messaging system may generate and send an SMS message to the invited phone contact communicating an invitation to the messaging system. The messaging system may register the user of the client device 305 to add the invited phone contact as a messaging contact with the messaging system and messaging client if the invited phone contact accepts the invitation.

In some embodiments, a phone contact add dialog 360 may include information regarding a selected phone contact. Phone contact information may include, without limitation, a photo, a name, and one or more additional pieces of information regarding the phone contact, such as a phone number for the phone contact. This information may be presented as, for example, a user profile card.

Figure 4:
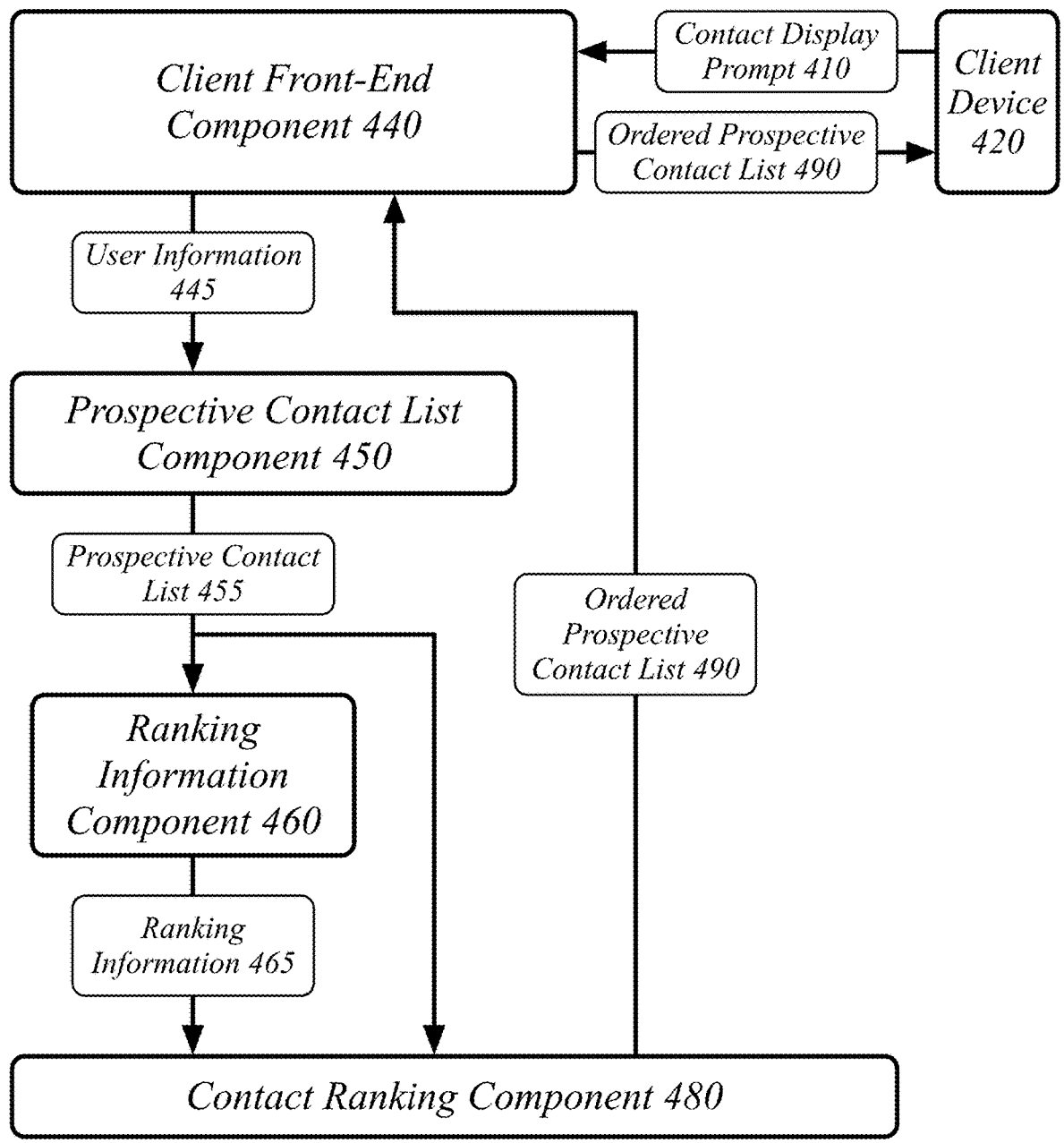
FIG. 4 illustrates an embodiment of an address book contact promotion system processing a contact display prompt.

FIG. 4 illustrates an embodiment of an address book contact promotion system processing a contact display prompt.

The address book contact promotion system 100 may comprise a plurality of components. The address book contact promotion system 100 may be operative to provide an ordered prospective contact list 490 to a client device 420. The ordered prospective contact list 490 may configure the client device 420 for display of the phone contacts according to ranking weights.

The address book contact promotion system 100 may comprise a client front-end component 440. The client front-end component 440 is generally arranged to exchange information with client devices to empower the client devices to engage in messaging activity using a messaging system. The client front-end component 440 provides access to various messaging services and/or social-networking services. The client front-end component 440 provides an ordered prospective contact list 490 to a client device 420. The retrieval of an ordered prospective contact list 490 may be performed in association with a display of a discovery interface on the client device 420, a display of an inbox interface on the client device 420, a display of a search interface on the client device 420, without limitation.

The client front-end component 440 receives a contact display prompt 410 for a user account from a client device 420. The user account may be an account registered with a messaging system. A contact display prompt 410 may be a display of a discovery interface, an inbox interface, or any other opportunity to display phone contacts. A discovery interface may comprise, in some instances, a null-state search box.

The address book contact promotion system 100 may comprise a prospective contact list component 450. The prospective contact list component 450 is generally arranged to retrieve and manage prospective contacts. The prospective contact list component 450 is operative to determine a prospective contact list 455 for the user account. The prospective contact list component 450 receives user information 445 from the client front-end component 440 identifying the user account for a client device 420. For instance, the user information 445 may comprise a user identifier uniquely identifying the user account within the address book contact promotion system 100.

The address book contact promotion system 100 may comprise a ranking information component 460. The ranking information component 460 is generally arranged to determine ranking information 465 for a user in relation to phone contacts based on user information for users of the address book contact promotion system 100. The user information may comprise social-networking information for a social-networking service, such as may derived from a social graph 200. The ranking information component 460 generates ranking information 465 for the user and provides the ranking information 465 to the contact ranking component 480.

A contact ranking component 480 determines a ranking weight for each prospective contact on the prospective contact list 455 based on the ranking information 465. The contact ranking component 480 orders the prospective contact list 455 for display for the user account based on the determined ranking weight for each prospective contact on the prospective contact list 455 to generate the ordered prospective contact list 490. The contact ranking component 480 then provides the ordered prospective contact list 490 to the client front-end component 440, which sends the ordered prospective contact list 490 to the client application on the client device 420.

The client front-end component 440 receives a contact display prompt 410 from a client application on a client device. A contact display prompt 410 is any indication from a client device 420 that there is an opportunity to display an ordered prospective contact list 490 on the client device 420. In some instances, the contact display prompt 410 may comprise a discovery-interface display prompt, wherein a discovery interface is generated for display on a client device 420. In other instances, the contact display prompt 410 may comprise an inbox display prompt, wherein an inbox interface is generated for display on a client device 420. Other instances may prompt a contact display prompt 410. This client application may be associated with a user account.

The client front-end component 440 receives an address book from the client device 420. The received address book is external to the client application. The client application may maintain its own list of contacts for a user account. This list of contacts may include information retrieved from the address book, but is still distinct from the address book. The address book may comprise a telephone address book for the client device 420. A telephone address book corresponds to an address book for the client device 420 used by the client device 420 for telephone calls and/or SMS messages. The address book comprises a plurality of address book entries. Each of the address book entries may comprise an address book entry name and an address book entry phone number. The address book entries may comprise additional information, such as, without limitation, an address book photo.

The prospective contact list component 450 determines a prospective contact list 455 based on the address book. The prospective contact list comprises a plurality of prospective contacts. Each of the prospective contacts corresponds to one of the address book entries from the address book. The prospective contacts are selected by the prospective contact list component 450 for consideration for promotion to the user of the client device 420 and therefore for the determination of a ranking weight to determine whether each of the prospective contacts should be promoted to the user of the client device 420 and, if so, how prominently. In some embodiments, a predefined number of the highest-ranked prospective contacts may be promoted on the client device 420. In some embodiments, only those prospective contacts that meet or exceed a threshold ranking weight may be promoted on the client device 420. In some embodiments, prospective contacts may only be promoted on the client device 420 when at least a predefined threshold number of prospective contacts are determined that exceed the predefined threshold ranking weight, so as to not generate a display interface for prospective contacts when an inadequate number of prospective contacts are available.

The plurality of prospective contacts may be selected from the plurality of address book entries based on the plurality of prospective contacts not being users of the client application. The plurality of prospective contacts may be so selected in order to promote the client application to people who are not currently users of the client application. In some embodiments, determining whether a prospective contact is currently a user of the client application may not be precisely determined and may instead be estimated based on phone number registries of users of the client application. As such, selecting the plurality of prospective contacts from the plurality of address book entries based on the plurality of prospective contacts not being users of the client application comprise the plurality of prospective contacts not matching against known users of the client application.

Similarly, where the client application is associated with a messaging system—such as being a messaging client for the messaging system—the plurality of prospective contacts may be selected from the plurality of address book entries based on the plurality of prospective contacts not being users of the messaging system. A prospective contact may be a user of the messaging system but not a user of the messaging client for the messaging system in embodiments where the messaging system supports users through endpoints other than the messaging client. For example, the messaging system may include a web site providing access to the messaging system. This may particularly be the case where the messaging system supports additional functionality beyond messaging, such as where the messaging system is a social-networking system, with the messaging functionality a portion of the social-networking functionality of the social-networking system.

The prospective contact list component 450 may determine the prospective contact list 455 by comparing the address book entries to a user phone number registry for a messaging system to determine which of the address book entries have phone numbers that aren't in the user phone number registry. These address book entries then make up the prospective contact list 455.

The prospective contact list component 450 extracts a plurality of phone numbers from the plurality of address book entries. Each of the phone numbers corresponds to one of the address book entries. In some cases, an address book entries may be associated with more than one phone number. For example, an address book entry may have, without limitation, two or more of a cellular phone number, home phone number, or work phone number. An address book entry may be selected as a prospective contact where none of the numbers associated with it match any phone number in the user phone number registry.

The prospective contact list component 450 may match the plurality of phone numbers against user phone numbers registered with the messaging system to determine the plurality of prospective contacts. The user phone numbers registered with the messaging system may be stored in a user phone number registry. The plurality of prospective contacts is then determined based on the plurality of prospective contacts being associated with a plurality of prospective phone numbers from the plurality of phone numbers such that the plurality of prospective phone numbers do not match the user phone numbers registered with the messaging system.

An ordered prospective contact list 490 may comprise a plurality of controls. The ordered prospective contact list 490 comprising the plurality of controls may correspond to each of the prospective contacts of the prospective contact list 490 being associated with information empowering the client device 420 to display a plurality of controls for a user offering the user the ability to invite a user to use the messaging system. The plurality of controls may be operative to initiating a phone-number-based invitation to the messaging system for the plurality of prospective contacts based on the plurality of prospective phone numbers. These phone-number-based invitations may be SMS invitations, wherein a SMS invite message is sent to an invited phone number from the messaging system. In some embodiments, the user may be empowered to specify text to be included as part of the SMS invitation to personal the invitation.

An SMS invite message may comprise a text-based invitation from the messaging system communicating the invitation. The SMS invite message may comprise a uniform resource locator (URL), with the URL offering access to a web page for registration with the messaging system. The URL may include identifying information empowering identification of the prospective contact. The messaging system may then use the identifying information to customize a registration page to the prospective contact based on the prospective contact having been invited by the user of the client device 420. For example, the messaging system may show profile information for the inviting user of the client device 420 showing that a friend of the invited user has already registered with the messaging system and can be communicated with using the messaging system.

The client application on the client device 420 may provide an address book for the client device 420 to the messaging system, and therefore to the address book contact promotion system 100, upon registration of the user of the client device 420 with the messaging system. Registration with the messaging system may, in some embodiments, be implicit in registration for a system of which the messaging system is a component, such as registration for a social-networking system that includes messaging functionality. In some of these cases, the user may download the client application and register their user account using the client application. However, in some cases, the user of the client device 420 may register with the messaging system, or a social-networking system, using a distinct device, such as a personal computer with web browser, and then download the client application on the client device 420 to access the messaging system. Similarly, the user may register using the client device 420, but with a web browser on the client device 420, and then download the client application. In these cases, the address book may be uploaded from the client device 420 to the client front-end component 440 when the client application is registered with the user account for the user with the messaging system. It will be appreciated that prior to uploading the address book, the client application may request a user's permission to access and use the address book for their client device 420 and may refrain from accessing and uploading the address book unless such permission is given.

There may be, therefore, an initial upload of the address book for the client device 420 associated with creating a user account with a messaging system, creating a user account with a social-networking system, or registering a client application with a messaging system or social-networking system (which client application registration may be implicit in creating a user account using the client application). This initial upload may be followed by one or more subsequent update uploads for the address book to the client front-end component 440. These subsequent update uploads may be complete uploads of an entire updated address book, or may be incremental updates comprising the changes to the address book from the version stored by the prospective contact list component 450, the updates since the last address book update upload.

The client front-end component 440 may therefore receive a series of address book updates from the client device 420. The address book updates are for an address book external to the client application. Each of the plurality of address book updates is associated with a reception date indicating the date, which may include the time, at which the address book update was sent or received. The client front-end component 440 passes the address book updates to the prospective contact list component 450 for updating of the server registry of the user's address book, so that additions to the user's address book may be considered for inclusion in the prospective contact list 455.

The ranking information component 460 may determine recency for each of the plurality of prospective contacts based on the address book updates. The recency for a prospective contact drawn from an address book may be determined based on the date on which the address book update was received that first contained the prospective contact. The recency for a prospective contact is measured based on the time between the first address book upload—which may be the first address book upload or any subsequent update—and the current time. This recency information for each of the prospective contacts may be included in the ranking information passed from the ranking information component 460 to the contact ranking component 480.

The contact ranking component 480 then generates the ranking weight for each of the plurality of prospective contacts based on the recency for each of the plurality of prospective contacts. The contact ranking component 480 may assign a higher ranking weight where a prospective contact is more recent as compared to a lower ranking weight where the prospective contact is less recent. It will be appreciated that generating the ranking weight for each of the plurality of prospective contacts based on the recency for each of the plurality of prospective contacts may not be an exclusive basis for the ranking weight, but instead combined with other techniques for determining the ranking weight. As such, more recent prospective contacts may be assigned a ranking weight adjustment—such as, without limitation, an additive or multiplicative adjustment—increasing their ranking weight as compared to less recent prospective contacts.

A recency measure may, alternatively or additionally, be generated based on a SMS log for the client device 420. The client application on the client device 420 may request user permission to retrieve and share SMS information for the client device 420 with the address book contact promotion system 100. Where such user permission is received, the client application may upload SMS information to the client front-end component 440 for use by the ranking information component 460 in determining ranking information 465. The SMS information may comprise a log of SMS messages sent or received, may comprise SMS message sending and/or receiving frequency for each address book entries, or other SMS information indicating a recency and/or frequency of SMS interaction between a user of the client device 420 and the address book entries.

The ranking information component 460 may determine SMS recency, SMS frequency, and/or a combined SMS recency/frequency measure for each of the plurality of prospective contacts based on the SMS information received from the client device 420. The SMS recency for a prospective contact is measure based on the last time a SMS message was sent to or received from the prospective contact, with more-recent SMS interactions resulting in a higher ranking weight. The SMS frequency for a prospective contact is measured based on the rate at which a SMS message is sent to or received from the prospective contact, with a higher frequency resulting in a higher ranking weight. A combined SMS recency/frequency measure may apply a decay function, or use other techniques, to combine the recency of an SMS interaction with the frequency of SMS interaction, so as to increase the weight of prospective contacts with which SMS interactions have been both recent and at a high rate. The SMS measure for a prospective contact may be included in the ranking information passed from the ranking information component 460 to the contact ranking component 480.

The contact ranking component 480 then generates the ranking weight for each of the plurality of prospective contacts based on the SMS measure. It will be appreciated that generating the ranking weight for each of the plurality of prospective contacts based on the SMS measure for each of the plurality of prospective contacts may not be an exclusive basis for the ranking weight, but instead combined with other techniques for determining the ranking weight. As such, prospective contacts with a higher SMS measure may be assigned a ranking weight adjustment—such as, without limitation, an additive or multiplicative adjustment—increasing their ranking weight as compared to prospective contacts with a lower SMS measure.

Similarly to the use of SMS information to generate an SMS measure, other forms of communication that are distinct from a messaging system may be used to generate information to improve the performance of the address book contact promotion system 100. For instance, the client application on the client device 420 may provide voice-call information to the client front-end component 440 to generate a voice-call measure reflecting recency and/or frequency for voice calls. The voice-call measure may be used to determine, at least in part, the ranking weight for a prospective contact. The client application on the client device 420 may provide email information to the client front-end component 440 to generate an email measure reflecting recency and/or frequency of email contact. The email measure may be used to determine, at least in part, the ranking weight for the prospective contact. The providing of voice call information and/or email information may, as with SMS, be predicated upon user permission to share the information with the address book contact promotion system 100.

The ranking information component 460 may determine a proxy messaging affinity between the user of the client device 420 and the plurality of prospective contacts of the prospective contact list 455. A messaging system may employ techniques to determines messaging affinities between pairs of users of the messaging system. Connection in a social-networking system may include an affinity score that describes how closely connected two users are. Affinities may be determined, for example, based on users' interactions with each other (e.g., sending a message to another user, liking another user's post, posting messages to another user's page, etc.), common interests shared between users, or any other social-networking information or messaging information.

The ranking information component 460 uses the messaging affinities between existing users of the messaging system to determine the proxy messaging affinity between a user and a prospective contact. For each prospective contact on the prospective contact list 455, the ranking information component 460 finds existing contacts for the user who also have the prospective contact as an address book entry in their uploaded address book. Existing contacts for the user may be messaging contacts for the messaging system that the user has registered for use with the messaging client for the messaging system. The existing contacts that also have a prospective contact as an address book entry in their uploaded address book are the user's linking contacts to that prospective contact. The user's messaging affinity to these linking contacts is used as the proxy for the user's messaging affinity to the prospective contact.

As such, the ranking information component 460 determines one or more existing contacts with the client application for the user account. The ranking information component 460 determines one or more linking contacts based on the one or more linking contacts having one or more address book entries for one or more linked prospective contacts of the plurality of prospective contacts. A linked prospective contact is a prospective contact for which the user of the client device 420 has a linking contact.

The ranking information component 460 determines a messaging affinity for each of the one or more linking contacts. This messaging affinity is passed to the contact ranking component 480 as at least a part of the ranking information 465 provided to the contact ranking component 480. The contact ranking component 480 then determines the ranking weight for each of the one or more linked prospective contacts based on the messaging affinity for each of the one or more linking contacts. Where multiple linking contacts are found for a particular linked prospective contact, the multiple messaging affinities—one for each linking contact—may be combined using various techniques, such as by selecting the minimum messaging affinity, the maximum messaging affinity, the average messaging affinity, the number or percentage of linking contacts with a messaging affinity that exceeds a defined threshold, or any other technique for combining weights.

In general, the messaging affinity may be based on social-networking information for the one or more linking contacts. The determination of the messaging affinity may be based on a rule-based model weighting ranking factors of the social-networking information and/or messaging information describing the relationship between the user of the client device 420—as represented by the user account for the user—and the one or more linking contacts. The messaging affinity for each of the plurality of linking contacts may specifically be based on a function, such as a linear function, taking as input the social-networking information and/or messaging information. This function may be determined based on a linear regression of a historical data set for messaging interactions and/or prospective contact invitations.

In general, the messaging affinity for the one or more linking contacts may be based on a linear regression of a historical data set for messaging interactions and/or prospective contact invitations. The linear regression sets one or more values determining how the various factors that contribute to the messaging affinity are combined to produce the messaging affinity for each linking contact. The linear regressions optimizes for a particular measure.

In some cases, the linear regression may optimize for a meaningful-conversation measure. A meaningful-conversation measure between the user account for the user of the client device 420 and a linking contact is based on whether the user account and the linking contact have carried out a meaningful conversation using the messaging system. The meaningful-conversation measure may be determined based on an amount of messages exchanged, a frequency of messages exchanged, a combination of these factors, or according to additional or alternative factors.

In some cases, the linear regression may optimize for an invitation-sent measure. An invitation-sent measure optimizes based on whether the promotion of an address book entry to a user is responded to by that user with the actual sending of an invitation to the promoted address book entry. Optimization based on the invitation-sent measure optimizes the one or more values determining how the various factors that contribute to the messaging affinity are combined so as to better predict the sending of an invitation to a promoted address book entry.

As the invitation-sent measure makes use of a historical data set for the operation of address book entry promotion, the invitation-sent measure may be used once the address book contact promotion is in effect for a messaging system. In contrast, the meaningful-conversation measure may be used based on a historical data set for the messaging system gathered prior to an activation of address book contact promotion to users of the messaging system as it does not measure the success of address book contact promotion. Of course, it may also or continue to be used once address book contact promotion is in effect. As such, the address book contact promotion system 100 may use optimization based on a meaningful-conversation measure during an initial period of address book contact promotion and then switch to optimization based on an invitation-sent measure once a data set for the success of address book contact promotion has been gathered.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 may receive a prospective contact display prompt from a client application on a client device, the client application associated with a user account at block 502.

The logic flow 500 may receive an address book from the client device, the address book external to the client application, the address book comprising a plurality of address book entries at block 504.

The logic flow 500 may determine a prospective contact list based on the address book, the prospective contact list comprising a plurality of prospective contacts at block 506.

The logic flow 500 may determine a ranking weight for each of the plurality of prospective contacts at block 508.

The logic flow 500 may generate an ordered prospective contact list by ordering the prospective contact list based on the ranking weight for each of the plurality of prospective contacts at block 510.

The logic flow 500 may send the ordered prospective contact list to the client application on the client device at block 512.

The embodiments are not limited to this example.

Figure 6:
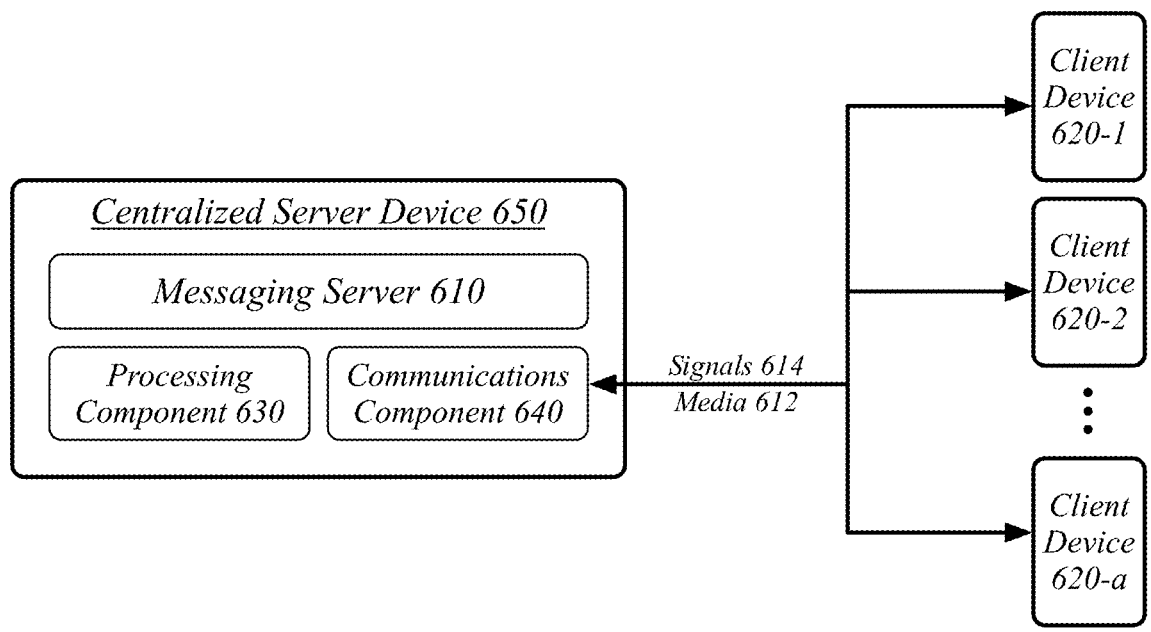
FIG. 6 illustrates an embodiment of a centralized system for the system of FIG. 1.

FIG. 6 illustrates a block diagram of a centralized system 600. The centralized system 600 may implement some or all of the structure and/or operations for the address book contact promotion system 100 in a single computing entity, such as entirely within a single centralized server device 650.

The centralized server device 650 may comprise any electronic device capable of receiving, processing, and sending information for the address book contact promotion system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 650 may execute processing operations or logic for the address book contact promotion system 100 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 650 may execute communications operations or logic for the address book contact promotion system 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 612 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 650 may communicate with other devices over a communications media 612 using communications signals 614 via the communications component 640. The devices may be internal or external to the centralized server device 650 as desired for a given implementation.

The centralized server device 650 may execute a messaging server 610. The messaging server 610 may comprise a messaging server for a messaging system, such as a messaging server performing messaging server functions as described for the messaging servers 110 in reference to FIG. 1. The messaging server 610 may provide messaging operations for a plurality of client devices 620, receiving and sending messages between the client devices 620. The client devices 620 may correspond to one or more of a smartphone device 150, tablet device 160, personal computer device 180, and/or any of the client device 305, client device 420, or any other client device.

Figure 7:
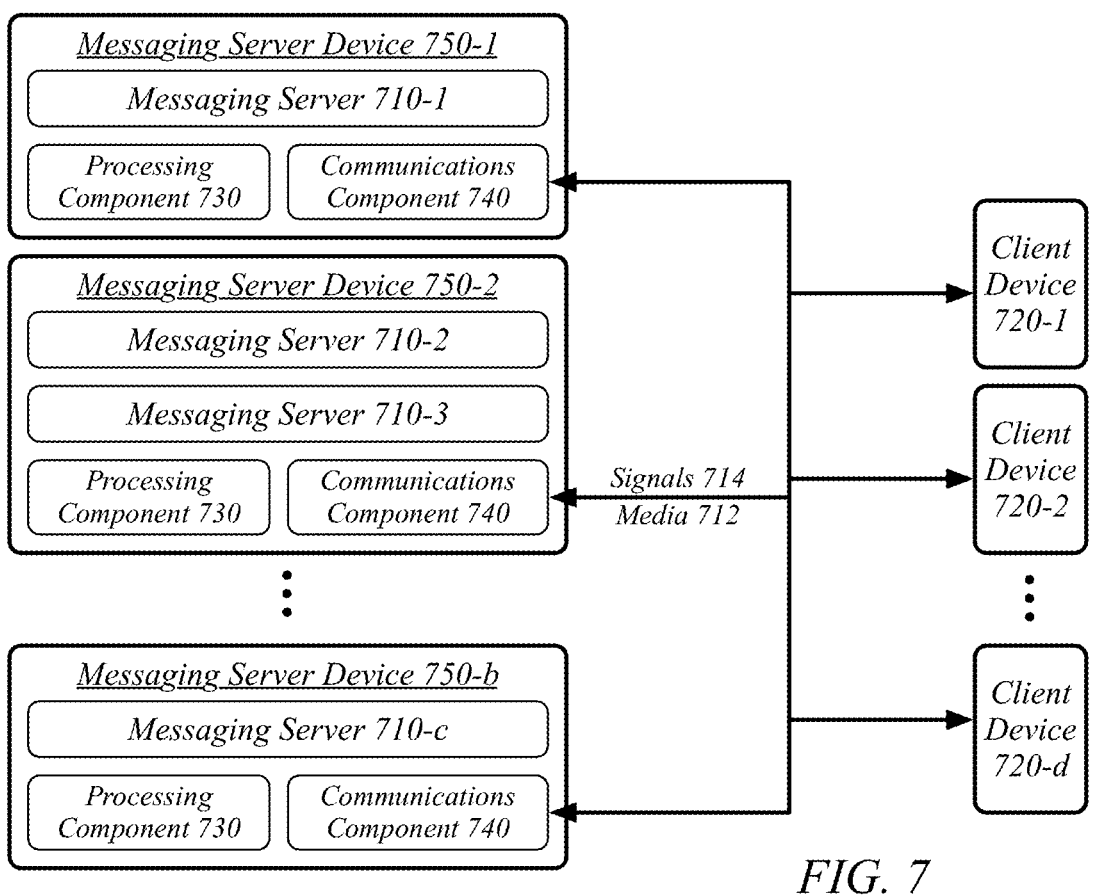
FIG. 7 illustrates an embodiment of a distributed system for the system of FIG. 1.

FIG. 7 illustrates a block diagram of a distributed system 700. The distributed system 700 may distribute portions of the structure and/or operations for the address book contact promotion system 100 across multiple computing entities. Examples of distributed system 700 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 700 may comprise a plurality of messaging server devices 750. In general, the server devices 750 may be the same or similar to the centralized server device 650 as described with reference to FIG. 6. For instance, the server devices 750 may each comprise a processing component 730 and a communications component 740 which are the same or similar to the processing component 630 and the communications component 640, respectively, as described with reference to FIG. 6. In another example, the server devices 750 may communicate over a communications media 712 using communications signals 714 via the communications components 740.

The messaging server devices 750 may comprise or employ one or more server programs that operate to perform various methodologies in accordance with the described embodiments. In one embodiment, for example, the messaging server devices 750 may each execute one of a plurality of messaging servers 710. The messaging servers 710 may comprise messaging servers for a messaging system, such as a messaging servers performing messaging server functions as described for the messaging servers 110 in reference to FIG. 1. The messaging servers 710 may provide messaging operations for a plurality of client devices 720, receiving and sending messages between the client devices 720. The client devices 720 may correspond to one or more of a smartphone device 150, tablet device 160, personal computer device 180, and/or any of the client device 305, client device 420, client devices 620, or any other client device.

Figure 8:
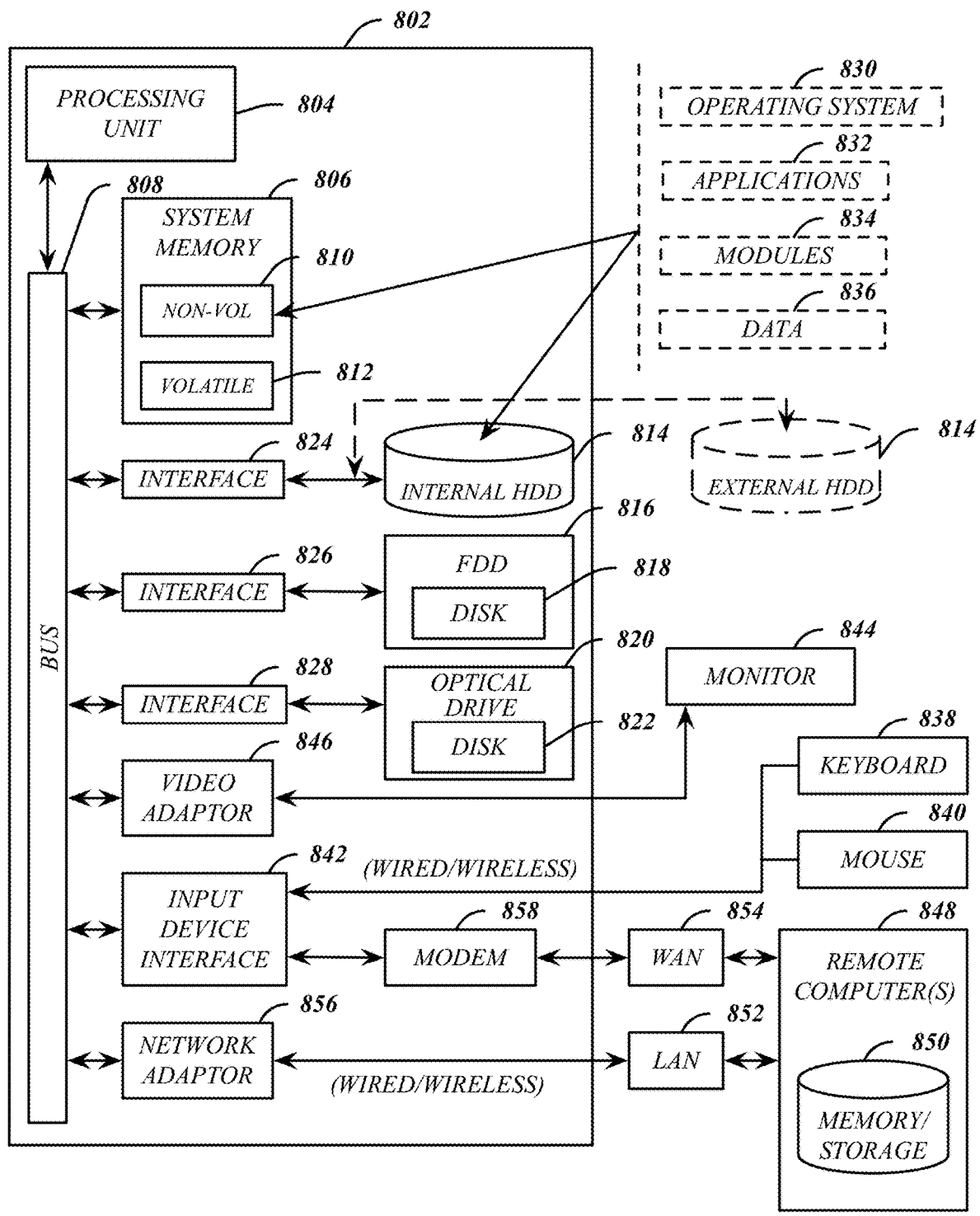
FIG. 8 illustrates an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the address book contact promotion system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
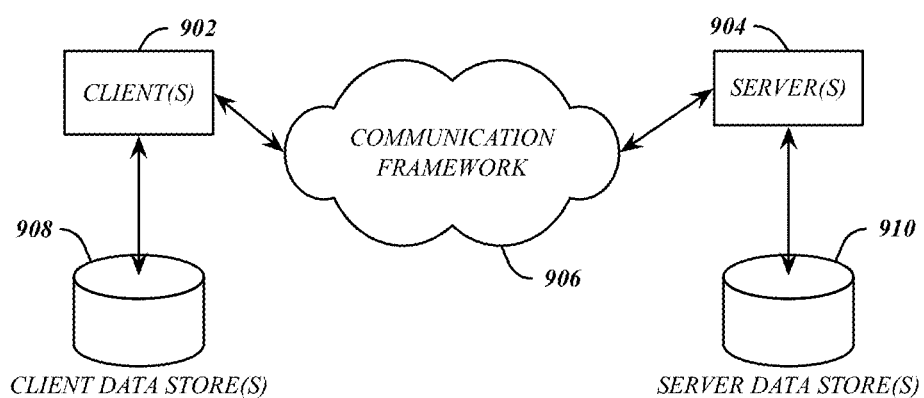
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement messaging clients. The servers 904 may implement messaging servers 110. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 10:
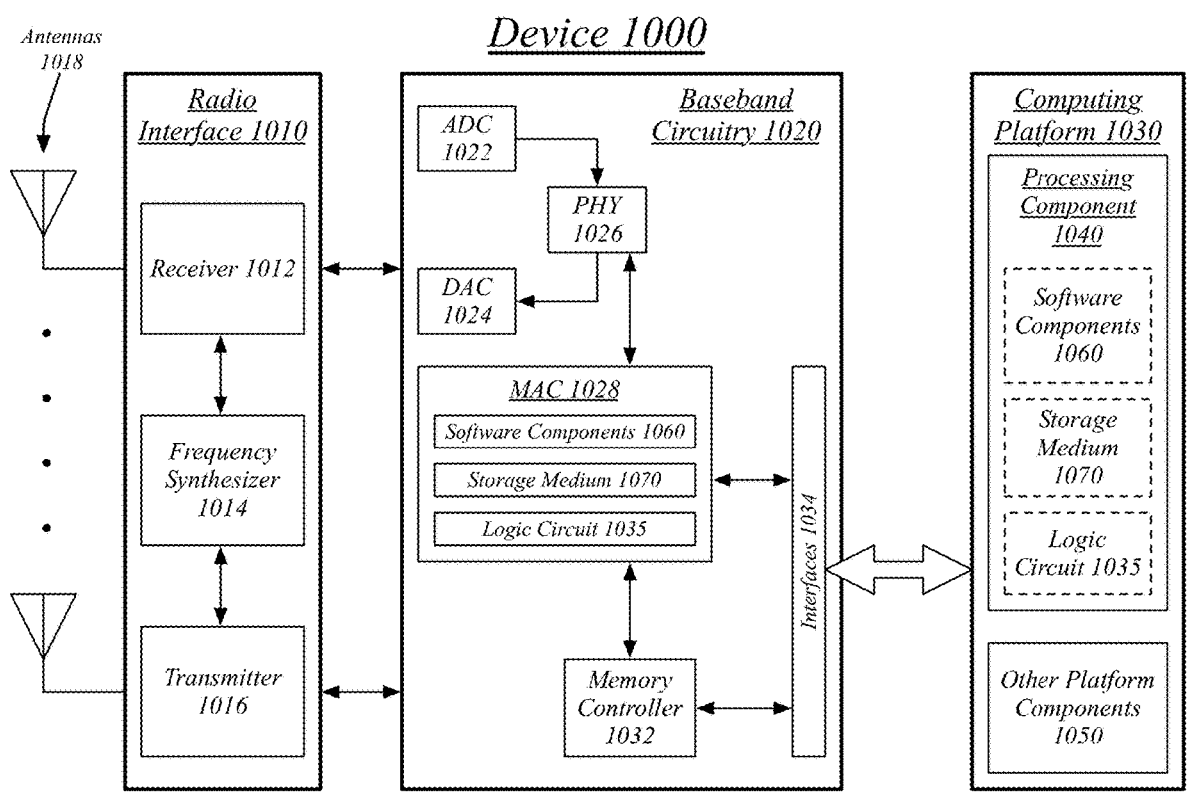
FIG. 10 illustrates an embodiment of a radio device architecture.

FIG. 10 illustrates an embodiment of a device 1000 for use in a multicarrier OFDM system, such as the address book contact promotion system 100. Device 1000 may implement, for example, software components 1060 as described with reference to address book contact promotion system 100 and/or a logic circuit 1035. The logic circuit 1035 may include physical circuits to perform operations described for the address book contact promotion system 100. As shown in FIG. 10, device 1000 may include a radio interface 1010, baseband circuitry 1020, and computing platform 1030, although embodiments are not limited to this configuration.

The device 1000 may implement some or all of the structure and/or operations for the address book contact promotion system 100 and/or logic circuit 1035 in a single computing entity, such as entirely within a single device. Alternatively, the device 1000 may distribute portions of the structure and/or operations for the address book contact promotion system 100 and/or logic circuit 1035 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1056 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with processing circuit 1028 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames, such as radio frames. Alternatively or in addition, MAC processing circuit 1028 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for the address book contact promotion system 100 and logic circuit 1035 using the processing component 1040. The processing component 1040 (and/or PHY 1026 and/or MAC 1028) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated one or more of the 3GPP LTE Specifications and/or IEEE 1002.16 Standards for WMANs, and/or other broadband wireless networks, cited herein, although the embodiments are not limited in this respect.

Embodiments of device 1000 may be implemented using single input single output (SISO) architectures. However, certain implementations may include multiple antennas (e.g., antennas 1018) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a prospective contact display prompt from a client application on a client device, the client application associated with a user account; receiving an address book from the client device, the address book external to the client application, the address book comprising a plurality of address book entries; determining a prospective contact list based on the address book, the prospective contact list comprising a plurality of prospective contacts; determining a ranking weight for each of the plurality of prospective contacts; generating an ordered prospective contact list by ordering the prospective contact list based on the ranking weight for each of the plurality of prospective contacts; and sending the ordered prospective contact list to the client application on the client device.

A computer-implemented method may further comprise the plurality of prospective contacts selected from the plurality of address book entries based on the plurality of prospective contacts not being users of the client application.

A computer-implemented method may further comprise the client application associated with a messaging system, wherein the plurality of prospective contacts selected from the plurality of address book entries based on the plurality of prospective contacts not being users of the messaging system.

A computer-implemented method may further comprise the client application associated with a messaging system, further comprising: extracting a plurality of phone numbers from the plurality of address book entries; and matching the plurality of phone numbers against user phone numbers registered with the messaging system to determine the plurality of prospective contacts, the plurality of prospective contacts determined based on the plurality of prospective contacts being associated with a plurality of prospective phone numbers from the plurality of phone numbers such that the plurality of prospective phone numbers do not match the user phone numbers registered with the messaging system.

A computer-implemented method may further comprise the ordered prospective contact list comprising a plurality of controls operative to initiating a phone-number-based invitation to the messaging system for the plurality of prospective contacts based on the plurality of prospective phone numbers.

A computer-implemented method may further comprise receiving a plurality of address book updates from the client device, the address book updates for the address book external to the client application, wherein each of the plurality of address book updates is associated with a reception date; determining recency for each of the plurality of prospective contacts; and generating the ranking weight for each of the plurality of prospective contacts based on the recency for each of the plurality of prospective contacts.

A computer-implemented method may further comprise determining one or more existing contacts with the client application for the user account; determining one or more linking contacts of the one or more existing contacts based on the one or more linking contacts having one or more address book entries for one or more linked prospective contacts of the plurality of prospective contacts; determining a messaging affinity for each of the one or more linking contacts; and determining the ranking weight for each of the one or more linked prospective contacts based on the messaging affinity for each of the one or more linking contacts.

A computer-implemented method may further comprise determining the messaging affinity based on social-networking information for the one or more linking contacts.

A computer-implemented method may further comprise wherein the messaging affinity for the one or more linking contacts is based on a linear regression of a historical data set for prospective contact invitations, the linear regression optimizing for one or more of a meaningful-conversation measure and an invitation-sent measure.

An apparatus may comprise a client front-end component operative to receive a prospective contact display prompt from a client application on a client device, the client application associated with a user account; receive an address book from the client device, the address book external to the client application, the address book comprising a plurality of address book entries; and send the ordered prospective contact list to the client application on the client device; a prospective contact list component operative to determine a prospective contact list based on the address book, the prospective contact list comprising a plurality of prospective contacts; and a contact ranking component operative to determine a ranking weight for each of the plurality of prospective contacts; and generate an ordered prospective contact list by ordering the prospective contact list based on the ranking weight for each of the plurality of prospective contacts. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
    receiving a prospective contact display prompt from a client application on a client device associated with a user, the client application associated with a user account;
    receiving an address book from the client device, the address book external to the client application, the address book comprising a plurality of address book entries;
    determining a prospective contact list based on the address book, the prospective contact list comprising a plurality of prospective contacts;
    determining a proxy messaging affinity between the user and each of the plurality of prospective contacts;
    determining a ranking weight for each of the plurality of prospective contacts based at least in part on the determined proxy messaging affinity;
    generating an ordered prospective contact list by ordering the prospective contact list based on the ranking weight for each of the plurality of prospective contacts; and
    sending the ordered prospective contact list to the client application on the client device, and
    wherein the determining of the proxy messaging affinity between the user and each of the plurality of prospective contacts comprises determining one or more existing contacts with the client application for the user account and determining a messaging affinity between the user and each of one or more linking contacts of the one or more existing contacts, and
    wherein the messaging affinity between the user and each of the one or more linking contacts is used as the proxy messaging affinity between the user and each of the plurality of prospective contacts.

2. The method of claim 1, the client application associated with a messaging system, wherein the plurality of prospective contacts selected from the plurality of address book entries based on the plurality of prospective contacts not being users of the messaging system.

3. The method of claim 1, the client application associated with a messaging system, further comprising:
    extracting a plurality of phone numbers from the plurality of address book entries; and
    matching the plurality of phone numbers against user phone numbers registered with the messaging system to determine the plurality of prospective contacts, the plurality of prospective contacts determined based on the plurality of prospective contacts being associated with a plurality of prospective phone numbers from the plurality of phone numbers such that the plurality of prospective phone numbers do not match the user phone numbers registered with the messaging system.

4. The method of claim 3, the ordered prospective contact list comprising a plurality of controls operative to initiating a phone-number-based invitation to the messaging system for the plurality of prospective contacts based on the plurality of prospective phone numbers.

5. The method of claim 1, further comprising:
    receiving a plurality of address book updates from the client device, the address book updates for the address book external to the client application, wherein each of the plurality of address book updates is associated with a reception date;
    determining recency for each of the plurality of prospective contacts; and
    generating the ranking weight for each of the plurality of prospective contacts based on the recency for each of the plurality of prospective contacts.

6. The method of claim 1, wherein the determining of the proxy messaging affinity between the user and each of the plurality of prospective contacts further comprises:
    determining the one or more linking contacts of the one or more existing contacts based on the one or more linking contacts having one or more address book entries for one or more linked prospective contacts of the plurality of prospective contacts; and
    wherein the messaging affinity indicates, defines, or describes one or more of the following: (i) a level of interaction between the user and the respective linking contact, (ii) one or more common interests shared between the user and the respective linking contact, (iii) social-networking information related to the user and the respective linking contact, and (iv) messaging information related to the user and the respective linking contact.

7. The method of claim 6, wherein the messaging affinity for the one or more linking contacts is based on a linear regression of a historical data set for prospective contact invitations, the linear regression optimizing for one or more of a meaningful-conversation measure and an invitation-sent measure.

8. An apparatus, comprising:
a client front-end component operative to receive a prospective contact display prompt from a client application on a client device associated with a user, the client application associated with a user account; receive an address book from the client device, the address book external to the client application, the address book comprising a plurality of address book entries; and send an ordered prospective contact list to the client application on the client device;
a prospective contact list component operative to determine a prospective contact list based on the address book, the prospective contact list comprising a plurality of prospective contacts; and
a contact ranking component operative to determine a proxy messaging affinity between the user and each of the plurality of prospective contacts; determine a ranking weight for each of the plurality of prospective contacts based at least in part on the determined proxy messaging affinity; and generate the ordered prospective contact list by ordering the prospective contact list based on the ranking weight for each of the plurality of prospective contacts, and
wherein the determination of the proxy messaging affinity between the user and each of the plurality of prospective contacts comprises a ranking information component operative to determine one or more existing contacts with the client application for the user account and determine a messaging affinity between the user and each of one or more linking contacts of the one or more existing contacts, and
wherein the messaging affinity between the user and each of the one or more linking contacts is used as the proxy messaging affinity between the user and each of the plurality of prospective contacts.

9. The apparatus of claim 8, the client application associated with a messaging system, wherein the plurality of prospective contacts selected from the plurality of address book entries based on the plurality of prospective contacts not being users of the messaging system.

10. The apparatus of claim 8, the client application associated with a messaging system, further comprising:
the prospective contact list component operative to extract a plurality of phone numbers from the plurality of address book entries; and match the plurality of phone numbers against user phone numbers registered with the messaging system to determine the plurality of prospective contacts, the plurality of prospective contacts determined based on the plurality of prospective contacts being associated with a plurality of prospective phone numbers from the plurality of phone numbers such that the plurality of prospective phone numbers do not match the user phone numbers registered with the messaging system.

11. The apparatus of claim 10, the ordered prospective contact list comprising a plurality of controls operative to initiating a phone-number-based invitation to the messaging system for the plurality of prospective contacts based on the plurality of prospective phone numbers.

12. The apparatus of claim 8, further comprising:
the client front-end component operative to receive a plurality of address book updates from the client device, the address book updates for the address book external to the client application, wherein each of the plurality of address book updates is associated with a reception date;
a ranking information component operative to determine recency for each of the plurality of prospective contacts; and
the contact ranking component operative to generate the ranking weight for each of the plurality of prospective contacts based on the recency for each of the plurality of prospective contacts.

13. The apparatus of claim 8, wherein the determination of the proxy messaging affinity between the user and each of the plurality of prospective contacts further comprises:
determine the one or more linking contacts of the one or more existing contacts based on the one or more linking contacts having one or more address book entries for one or more linked prospective contacts of the plurality of prospective contacts; and wherein the messaging affinity indicates, defines, or describes one or more of the following: (i) a level of interaction between the user and the respective linking contact, (ii) one or more common interests shared between the user and the respective linking contact, (iii) social-networking information related to the user and the respective linking contact, and (iv) messaging information related to the user and the respective linking contact.

14. The apparatus of claim 13, wherein the messaging affinity for the one or more linking contacts is based on a linear regression of a historical data set for prospective contact invitations, the linear regression optimizing for one or more of a meaningful-conversation measure and an invitation-sent measure.

15. At least one computer-readable storage medium comprising instructions that, when executed, cause a system to:
receive a prospective contact display prompt from a client application on a client device associated with a user, the client application associated with a user account;
receive an address book from the client device, the address book external to the client application, the address book comprising a plurality of address book entries;
determine a prospective contact list based on the address book, the prospective contact list comprising a plurality of prospective contacts;
determine a proxy messaging affinity between the user and each of the plurality of prospective contacts;
determine a ranking weight for each of the plurality of prospective contacts based at least in part on the determined proxy messaging affinity;
generate an ordered prospective contact list by ordering the prospective contact list based on the ranking weight for each of the plurality of prospective contacts; and
send the ordered prospective contact list to the client application on the client device, and
wherein the determination of the proxy messaging affinity between the user and each of the plurality of prospective contacts comprises further instructions that, when executed, cause the system to determine one or more existing contacts with the client application for the user account and determine a messaging affinity between the user and each of one or more linking contacts of the one or more existing contacts, and wherein the messaging affinity between the user and each of the one or more linking contacts is used as the proxy messaging affinity between the user and each of the plurality of prospective contacts.

16. The computer-readable storage medium of claim 15, the client application associated with a messaging system, wherein the plurality of prospective contacts selected from the plurality of address book entries based on the plurality of prospective contacts not being users of the messaging system.

17. The computer-readable storage medium of claim 15, the client application associated with a messaging system, comprising further instructions that, when executed, cause a system to:
- extract a plurality of phone numbers from the plurality of address book entries; and
- match the plurality of phone numbers against user phone numbers registered with the messaging system to determine the plurality of prospective contacts, the plurality of prospective contacts determined based on the plurality of prospective contacts being associated with a plurality of prospective phone numbers from the plurality of phone numbers such that the plurality of prospective phone numbers do not match the user phone numbers registered with the messaging system.

18. The computer-readable storage medium of claim 15, comprising further instructions that, when executed, cause a system to:
- receive a plurality of address book updates from the client device, the address book updates for the address book external to the client application, wherein each of the plurality of address book updates is associated with a reception date;
- determine recency for each of the plurality of prospective contacts; and
- generate the ranking weight for each of the plurality of prospective contacts based on the recency for each of the plurality of prospective contacts.

19. The computer-readable storage medium of claim 15, wherein the determination of the proxy messaging affinity between the user and each of the plurality of prospective contacts comprises further instructions that, when executed, cause the system to:
- determine the one or more linking contacts of the one or more existing contacts based on the one or more linking contacts having one or more address book entries for one or more linked prospective contacts of the plurality of prospective contacts; and
- wherein the messaging affinity indicates, defines, or describes one or more of the following: (i) a level of interaction between the user and the respective linking contact, (ii) one or more common interests shared between the user and the respective linking contact, (iii) social-networking information related to the user and the respective linking contact, and (iv) messaging information related to the user and the respective linking contact.

20. The computer-readable storage medium of claim 19, wherein the messaging affinity for the one or more linking contacts is based on a linear regression of a historical data set for prospective contact invitations, the linear regression optimizing for one or more of a meaningful-conversation measure and an invitation-sent measure.

* * * * *